(12) United States Patent
Nakayama

(10) Patent No.: US 8,221,237 B2
(45) Date of Patent: Jul. 17, 2012

(54) GAME SOUND OUTPUT DEVICE, GAME SOUND CONTROL METHOD, INFORMATION RECORDING MEDIUM, AND PROGRAM

(75) Inventor: Hiroyuki Nakayama, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 968 days.

(21) Appl. No.: 12/282,835

(22) PCT Filed: Mar. 12, 2007

(86) PCT No.: PCT/JP2007/054829
§ 371 (c)(1),
(2), (4) Date: Sep. 12, 2008

(87) PCT Pub. No.: WO2007/105689
PCT Pub. Date: Sep. 20, 2007

(65) Prior Publication Data
US 2009/0137314 A1     May 28, 2009

(30) Foreign Application Priority Data

Mar. 13, 2006   (JP) ................................ 2006-066873

(51) Int. Cl.
*G06F 19/00* (2006.01)
*G10G 1/04* (2006.01)

(52) U.S. Cl. ......... 463/35; 463/40; 273/138.2; 273/460; 273/461; 345/475; 345/606; 381/61; 381/94.4; 725/133; 725/141; 725/153

(58) Field of Classification Search ............... 463/3, 16, 463/20, 35–37, 40; 273/138.1, 138.2, 139, 273/141 A, 141 R, 142 A, 142 B, 142 C, 273/142 H, 142 HA, 460–461; 84/484, 600, 84/635–636, 644–645, 651–652, 710, 730; 345/475, 606; 381/61–63, 94.4; 725/38, 725/40, 133, 141, 153; 968/818, 820–821; G06F 19/00; G10G 1/04
See application file for complete search history.

(56) References Cited

U.S. PATENT DOCUMENTS 5,548,655 A  *  8/1996  Takahashi ..................... 381/104
(Continued)

FOREIGN PATENT DOCUMENTS

JP           4-256814 A        9/1992
(Continued)

OTHER PUBLICATIONS

International Search Report PCT/JP2007/054829 dated May 15, 2007.

(Continued)

*Primary Examiner* — Arthur O. Hall
(74) *Attorney, Agent, or Firm* — Howard & Howard Attorneys PLLC

(57) ABSTRACT

A first sound volume calculation unit (251) obtains a length of a straight line connecting a sound emitting object and a sound detection object, and calculates a first sound volume attenuated from a predetermined reference sound volume in accordance with the length. A second volume calculation unit (252), in a case where on the straight line there is an other object that is an obstacle, calculates a second sound volume attenuated from the first sound volume by a predetermined ratio. A third volume calculation unit (253) draws from each of the sound emitting object and the sound detection object a plurality of space recognition lines that spread in plane and at a predetermined angle from the straight line locating as a center, and calculates a third sound volume attenuated from either one of the first sound volume and the second sound volume in accordance with an attenuation ratio determined by the number of the space recognition lines having a same angle and intersecting with each other without being intercepted by the other object that is an obstacle. An output sound control unit (207) outputs game sound based on the calculated third sound volume.

6 Claims, 11 Drawing Sheets

U.S. PATENT DOCUMENTS

| | | | |
|---|---|---|---|
| 5,993,318 A * | 11/1999 | Kousaki | 463/35 |
| 6,464,585 B1 * | 10/2002 | Miyamoto et al. | 463/35 |
| 6,540,613 B2 * | 4/2003 | Okubo et al. | 463/35 |
| 6,544,122 B2 * | 4/2003 | Araki et al. | 463/35 |
| 6,606,689 B1 * | 8/2003 | Cheng et al. | 711/137 |
| 6,679,776 B1 * | 1/2004 | Nishiumi et al. | 463/36 |
| 7,113,610 B1 * | 9/2006 | Chrysanthakopoulos | 381/309 |
| 7,338,373 B2 * | 3/2008 | Kawamura | 463/35 |
| 7,366,607 B2 * | 4/2008 | Nakaishi et al. | 701/431 |
| 7,480,386 B2 * | 1/2009 | Ogata | 381/310 |
| 7,618,322 B2 * | 11/2009 | Shimizu et al. | 463/36 |
| 8,077,888 B2 * | 12/2011 | Trepte | 381/310 |
| 2004/0254017 A1 * | 12/2004 | Cheng et al. | 463/35 |

FOREIGN PATENT DOCUMENTS

| | | | |
|---|---|---|---|
| JP | 7-178244 A | | 7/1995 |
| JP | 8-149600 A | | 6/1996 |
| JP | 10-254469 A | | 9/1998 |
| JP | 2000-250563 A | | 9/2000 |
| JP | 2001-275199 A | | 10/2001 |
| JP | 2002-336544 A | | 11/2002 |
| JP | 2003-62327 A | | 3/2003 |
| JP | 2003062327 A | * | 3/2003 |
| JP | 2004-267433 A | | 9/2004 |
| JP | 2006-30690 A | | 2/2006 |
| TW | 5781812 | | 1/2004 |
| TW | I232768 | | 5/2005 |

OTHER PUBLICATIONS

Office Action for counterpart Taiwanese Application No. 096108522 of Sep. 23, 2009, Taiwanese Search Report and English translation (12 pages).

Funkhouser, "Geometric Modeling of Sound Propagation in 3D Games." Princeton University 2003, XP001543355, [online], [retrieved on May 8, 2009]. Retrieved from the Internet <URL: ftp://ftp.cs.princeton.edu/pub/people/funk/talks/gdc03/archive/cdrom.ppt>, pp. F1-F33.

Funkhouser et al., "A Beam Tracing Method for Interactive Architectural Acoustics," J. Acoust. Soc. Am., (Feb. 2004), vol. 115, No. 2, XP002527098, [online], [retrieved on Oct. 8, 2009]. Retrieved from the Internet <URL:http://people.csail.mit.edu/addy/research/funk-beamtracing-jasa04.pdf>, pp. 739-756.

Supplementary European Search Report EP07738301 dated Jun. 30, 2009, 7 pages.

* cited by examiner

GAME SOUND OUTPUT DEVICE, GAME SOUND CONTROL METHOD, INFORMATION RECORDING MEDIUM, AND PROGRAM

TECHNICAL FIELD

The present invention relates to a game sound output device, a game sound control method, an information recording medium and a program suitable for easily providing an appropriate control of game sound.

BACKGROUND ART

A variety of game devices (video game device or the like) have been developed for years as household use and business use. Such a game device generally displays a game image that an object of a character or the like is arranged in a virtual space, and also outputs such as sound effect, background sound and vocalized sound.

In recent years, it becomes possible to create a game image with a high resolution (with reality) at high speed (in real time), because of an improvement of hardware performance and a development of an image processing technique, and then it becomes possible for a player to enjoy a game as if the player would be in a virtual space.

Meanwhile, a degree of development for game sound is not sufficient as compared to that for a game image; however, it balances with the game image by such as enhancing the background sound, with such as increasing in the number of sound sources which are possible to emit sounds therefrom at the same time.

Further, contrivances for enhancing reality of the game sound are made in some sort of game. As one example in a race game, a three-dimensional game device related technique has been disclosed, for identifying a type of a surrounding fixed object (a tunnel, a wall, a tree, or the like) and for changing a virtual reflected sound from the fixed object corresponding to the type thereof (for example, refer to the patent literature 1).
Patent Literature 1: Unexamined Japanese Patent Application KOKAI Publication No. 2002-336544 (pages 4 and 5, FIG. 1)

DISCLOSURE OF INVENTION

Problem to be Solved by the Invention

However, there has been a problem that it has not been able to provide a sufficient realism or the like to a player, as there are still many cases in that a reality is not enough regarding game sound in many games.

For example, regarding an action game or the like in that an enemy character to emit sound and a player character appear, a sound volume or the like of the emitted sound (game sound) is to be controlled in accordance with a distance between the enemy character and the player character. And then an appropriate game sound is to be output without any problem in particular in a case where there is no obstacle to obstruct between the enemy character and the player character.

However, there has been unattainability of adequate output of game sound in the case where there is any obstacle between the enemy character and the player character. This has given a sense of incongruity to the players.

As specific examples, there is such as a case where the enemy character Tc cannot be seen (not come into sight on a straight line) from the player character Jc due to be shaded by a building (a wall W) as shown in FIG. 8A, a case where the enemy character Tc exists at the other side of the wall W as shown in FIG. 8B, or the like.

In such the cases, emitting sound itself is stopped (game sound off) or contrarily the sound volume or the like are determined by simply using only the length of a straight line without considering the existence of the building (the wall W) in the present circumstances, because the enemy character Tc cannot come into sight on the straight line of the player character Jc. That is, in either cases, the game sound is not output in the same way, or the game sound is output with the sound volume as same as that of usual.

Hence, the player feels the sense of incongruity because such the game sound is noticeably different from the reality, and cannot feel a sufficient sense of reality.

That is, the sense of incongruity is caused because the player knows as real experience that the sound can be heard as somewhat less than usual in the case as shown in FIG. 8A, or that completely no sound can be heard (or sound can slightly be heard) in the case as shown in FIG. 8B.

For overcoming such sense of incongruity, it may be also considered to obtain an appropriate game sound using an acoustic simulation or the like. That is, a sound field is to be simulated by a complicated operation using positioning of sound source (the enemy character Tc), an obstacle (the wall W or the like) and a virtual microphone (the player character Jc) in a virtual space, and then the game sound is to be determined, for example.

However, it is hard to apply such the simulation to a game device due to an extraordinary high operational load thereof. In particular, it is actually impossible to perform such the simulation at high speed (in real time) for a game device.

Therefore, a technique has been required for appropriately controlling game sound without increasing the load of operation regarding a game device or the like as well.

The present invention has been made to overcome such problems, and it is an object of the present invention to provide a game sound output device, a game sound control method, an information recording medium and a program, which are capable of easily providing an appropriate control of game sound.

Means for Solving the Problem

A game sound output device according to a first aspect of the present invention is a game sound output device, in which a plurality of objects including a sound emitting object that emits sound and a sound detection object that detects the sound emitted by the sound emitting object are arranged in virtual space, and which outputs the sound detected by the sound detection object as game sound, the game sound output device comprising a first sound volume calculation unit, a second sound volume calculation unit, a third sound volume calculation unit and a sound volume control unit.

First, the first sound volume calculation unit obtains a length of a straight line connecting the sound emitting object and the sound detection object, and calculates a first sound volume attenuated from a predetermined reference sound volume in accordance with the length. Further, the second sound volume calculation unit, in a case where on the straight line there is an other object that is an obstacle, calculates a second sound volume attenuated from the first sound volume by a predetermined ratio;

On the other hand, a third volume calculation unit draws from both the sound emitting object and the sound detection object a same plural number of space recognition lines that spread in a plane and at predetermined angles from the straight line locating as a center, and calculates a third sound volume that is attenuated from either one of the first sound volume and the second sound volume in accordance with an attenuation ratio determined by the number of those space recognition lines having a same angle and intersecting with each other without being intercepted by the other object that is the obstacle; and a sound volume control unit (207) that outputs game sound based on the calculated third sound volume.

Thus, since a comparatively simple computation can be used to calculate the volume of the sound emitted by the sound emitting object, an appropriate control of game sound is attained without performing a complex calculation, such as acoustic simulation. As a result, an appropriate control of game sound can be achieved easily.

The first sound volume calculation unit may calculate the first sound volume that is attenuated from the sound emitted by the sound emitting object with the maximum sound volume thereof in accordance with an attenuation ratio determined by the obtained length of the straight line. In this case, it is possible to calculate an initial sound volume using the distance between the objects.

The second sound volume calculation unit may calculate the second sound volume attenuated in accordance with an attenuation ratio determined depending on a type of an other object that is an obstacle. In this case, it is possible to control the sound volume appropriately depending on a material or the like for the object.

The third sound volume calculation unit may draw from both the sound emitting object and the sound detection object a same plural number of space recognition lines that spread in three-dimension at predetermined angles from the straight line obtained by the first sound volume calculation unit and locating as a center, and calculate a third sound volume attenuated from either one of the first sound volume and the second sound volume in accordance with an attenuation ratio determined by the number of those space recognition lines having a same angle in three-dimension and intersecting with each other without being intercepted by the other object that is an obstacle. In this case, it is possible to check a positioning of an obstacle in three dimensions that may exist between the objects, and then it is possible to calculate an appropriate sound volume in a three-dimensional virtual space.

A game sound control method according to a second aspect of the present invention is a game sound control method for a game device in which a plurality of objects including a sound emitting object that emits sound and a sound detection object that detects the sound emitted by the sound emitting object are arranged in a virtual space, and which outputs the sound detected by the sound detection object as game sound, and comprises a first sound volume calculation step, a second sound volume calculation step, a third sound volume calculation step and a sound volume control step.

First, in the first sound volume calculation step, a length of a straight line connecting the sound emitting object and the sound detection object is obtained, and a first sound volume that is attenuated from a predetermined reference sound volume in accordance with the length is calculated. In the second volume calculation step, a second sound volume that is attenuated from the first sound volume by a predetermined ratio is calculated in a case where there is an other object that is an obstacle on the straight line.

On the other hand, in the third sound volume calculation step, from each of the sound emitting object and the sound detection object a same plural number of space recognition lines that spread in a plane and at predetermined angles from the straight line locating as a center is drawn, and a third sound volume attenuated from either one of the first sound volume and the second sound volume in accordance with an attenuation ratio determined by the number of those space recognition lines having a same angle and intersecting with each other without being intercepted by the other object that is an obstacle is calculated. Then, in the sound volume control step, game sound based on the calculated third sound volume is output.

Thus, since a comparatively simple computation can be used to calculate the volume of the sound emitted by an enemy object, an appropriate control of game sound is attained without performing a complex calculation, such as acoustic simulation. As a result, an appropriate control of game sound can be achieved easily.

An information recording medium according to a third aspect of the present invention records a program to control a computer (including an electronic device) to function as the above-described game sound output device.

A program according to a fourth aspect of the present invention is configured to control a computer (including an electronic device) to function as the above-described game sound output device.

The program can be recorded in a computer readable information recording medium, such as a compact disk, a flexible disk, a hard-disk, a magneto-optical disk, a digital video disk, a magnetic tape, a semiconductor memory, or the like.

The program can be distributed and sold, independently of a computer which executes the program, over a computer communication network. Moreover, the information recording medium can be distributed and sold, independently of the computer.

Effect of the Invention

According to the present invention, it is possible to realize easily an appropriate control of game sound.

Figure 1:
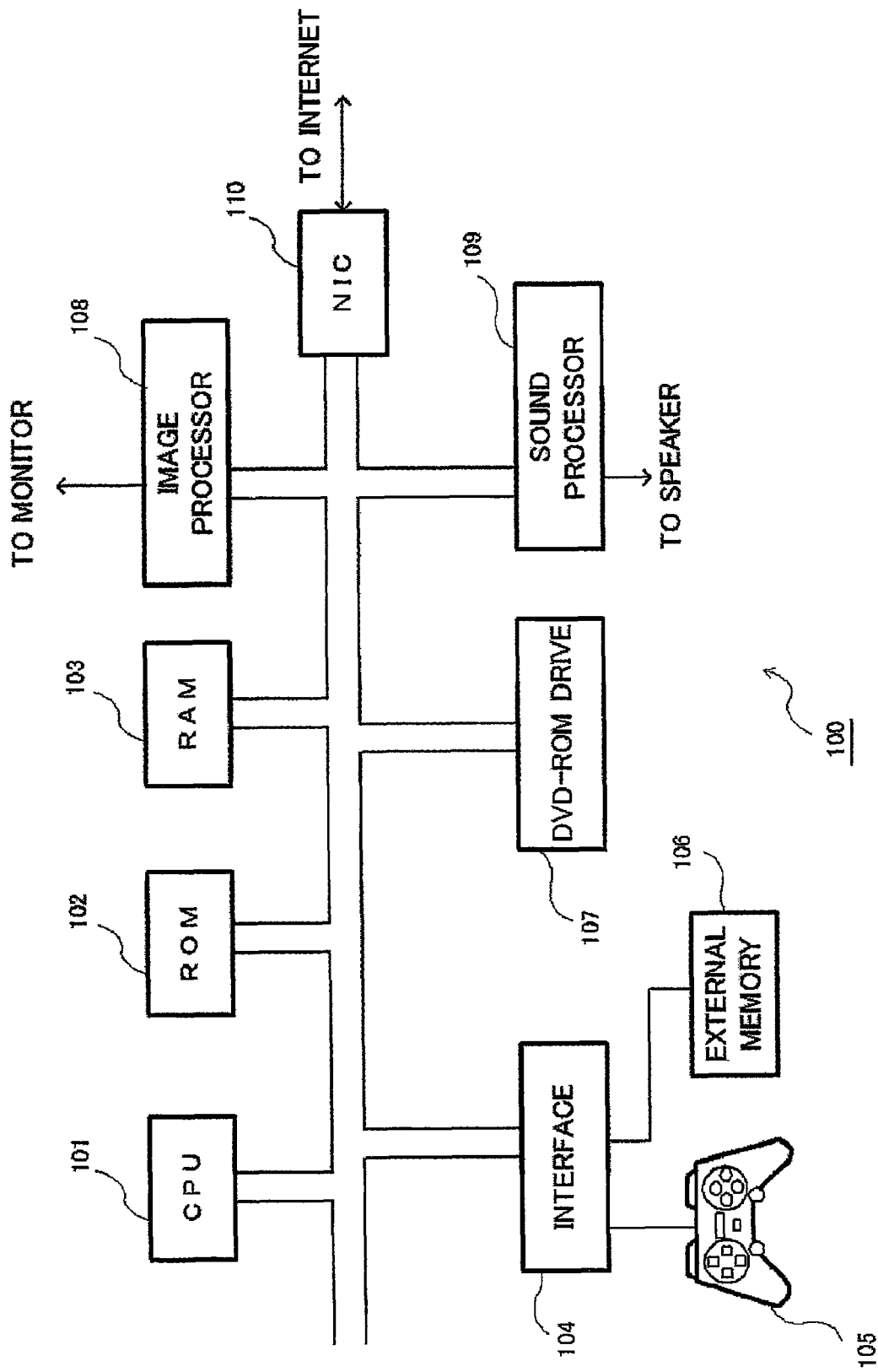
FIG. 1 A schematic diagram illustrating the schematic configuration of a game device according to the embodiment of the present invention.

DESCRIPTION OF REFERENCE NUMERALS 100 game device
101 CPU
102 ROM
103 RAM
104 interface
105 controller
106 external memory
107 DVD-ROM drive
108 image processor
109 sound processor
110 NIC
200 game sound output device
201 object storage unit
202 operation unit
203 character position management unit
204 image creation unit
205 sound volume calculation unit
206 sound source
207 output sound control unit

BEST MODE FOR CARRYING OUT THE INVENTION

An embodiment of the present invention will be described below. While the following describes an embodiment in which the present invention is adapted to a game device for the ease of understanding, however, the present invention is also possible to be adapted to an information processing device, such as various kinds of computers, PDA, portable telephone, or the like. That is, the embodiment to be described below is given by way of illustration only, and does not limit the scope of the invention. Therefore, those skilled in the art can employ embodiments in which the individual elements or all the elements are replaced with equivalent ones, and which are also encompassed in the scope of the invention.

Embodiment 1

FIG. 1 is an exemplary diagram illustrating the schematic configuration of a typical game device for realizing a game sound output device according to the embodiment of the present invention. A description will be given hereinbelow referring to the present diagram.

A game device 100 comprises a CPU (Central Processing Unit) 101, a ROM (Read Only Memory) 102, a RAM (Random Access Memory) 103, an interface 104, a controller 105, an external memory 106, a DVD-ROM (Digital Versatile Disc ROM) drive 107, an image processor 108, a sound processor 109 and an NIC (Network Interface Card) 110.

And then as a DVD-ROM storing a program and data for a game is loaded into the DVD-ROM drive 107 and the game device 100 is powered on, the program is executed to realize the game sound output device of the present embodiment.

The CPU 101 controls the general operation of the game device 100, and is connected to individual components to exchange such as a control signal or data therewith.

An IPL (Initial Program Loader) which is executed immediately after power-on is recorded in the ROM 102. As the IPL is executed, the program recorded in the DVD-ROM is read into the RAM 103 and its execution by the CPU 101 is started. Further, the RAM 102 stores a program and various data for an operating system necessary for controlling the overall operation of the game device 100.

The RAM 103 is for temporarily storing data and/or programs, and retains the program and/or data read from the DVD-ROM, and other data needed for such as progressing a game or chat communication.

The controller 105 connected via the interface 104 receives an operation input which is made when a user plays a game. For example, the controller 105 receives the input, such as a string of characters (message) or the like, according to the operation input.

The external memory 106 connected as detachable via the interface 104 stores data as rewritable, such as data indicating the progress status of the game, data of chat communication logs (records). As the user makes an instruction input via the controller 105, these data can appropriately be recorded in the external memory 106.

A program for realizing a game, image data and/or sound data accompanying the game are recorded in the DVD-ROM to be loaded into the DVD-ROM drive 107. Under the control of the CPU 101, the DVD-ROM drive 107 performs a process of reading from the DVD-ROM loaded therein, for reading a necessary program and/or data, and then these are temporarily stored in the RAM 103 or the like.

The image processor 108 processes data read from the DVD-ROM by using the CPU 101 and/or an image operation processor (not shown) provided in the image processor 108, and then records the data in a frame memory (not shown) provided in the image processor 108. Moreover, image information recorded in the frame memory is converted to a video signal at a predetermined synchronous timing, which is in turn output to a monitor (not shown) connected to the image processor 108. Thus, image displays of various types become to be available thereby.

Moreover, the image operation processor can perform high-speed execution for an overlay operation of a two-dimensional image, for a transparent operation such as an α blending or the like, and for various kinds of saturate operations.

Further, it is also possible to perform high-speed execution of an operation to acquire a rendered image with an overview of a polygon arranged in a virtual three-dimensional space from a predetermined view point position, by rendering using a Z buffer scheme for polygon information which is arranged in the virtual three-dimensional space and to which various kinds of texture information are added.

Furthermore, the CPU 101 and the image operation processor cooperate to be able to draw a string of characters as a two-dimensional image in the frame memory or on each polygon surface, according to font information which defines shapes of the characters. Here, such the font information is recorded in the ROM 102, however, font information for exclusive use may be also available, that are recorded in the DVD-ROM.

The sound processor 109 converts sound data read from the DVD-ROM to an analog sound signal, and then outputs the sound signal from a speaker (not shown) connected thereto. Moreover, it generates sound effects and music data which are required to be generated during the progress of a game, and then outputs sounds corresponding thereto, from the speaker under the control of the CPU 101.

The NIC 110 serves to connect the game device 100 to a computer communication network (not shown), such as the Internet or the like. Such the NIC 110 is pursuant to the 10 BASE-T/100 BASE-T standard which is to be used at the time of constructing a LAN (Local Area Network), or it is comprised of such as an analog modem for connecting to the Internet using a telephone circuit, an ISDN (Integrated Services Digital Network) modem, an ADSL (Asymmetric Digital Subscriber Line) modem, a cable model for connecting to the Internet using a cable television circuit, or the like, and of an interface (not shown) which intervenes between the CPU 101 and any one of such the modems.

In addition, the game device 100 may be configured to achieve the same functions as the ROM 102, the RAM 103, the external memory 106, the DVD-ROM which is to be loaded into the DVD-ROM drive 107, or the like, by using a large-capacity external storage device, such as a hard disk.

Moreover, a mode may also be employed where such as a keyboard for receiving an edit input of a string of characters from a user, a mouse for receiving an assignment and a selection input regarding various kinds of positions therefrom, or the like, is to be connected thereto.

Further, it may be also possible to use a typical computer, such as a general-purpose personal computer or the like, for the game sound output device in place of the game device 100 of the present embodiment. For example, a typical computer is provided with a CPU, a RAM, a ROM, a DVD-ROM drive, and an NIC, similarly to the game device 100. Moreover, a typical computer is also provided with an image processor having simplified functions compared to that of the game device 100, as well as a hard-disk that acts as an external storage device. Besides the above, a typical computer may also be configured to use storage media such as flexible disks, magneto-optical disks, and magnetic tape. Furthermore, it uses such as a keyboard, a mouse, or the like, for an input device, in place of the controller. And then it functions as the game sound output device when a game program is installed and such the program is executed therein.

(Schematic Configuration of the Game Sound Output Device)

Figure 2:
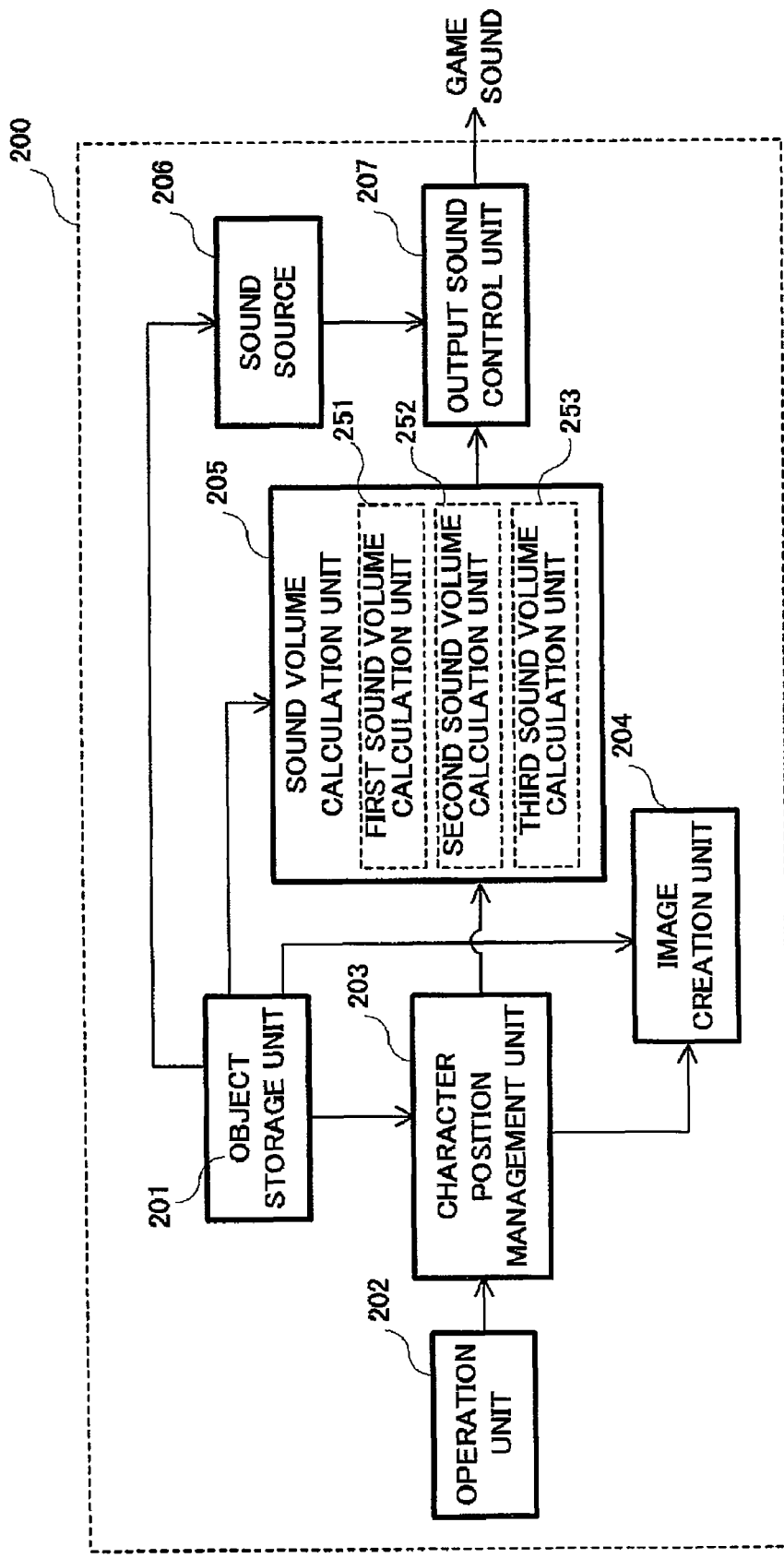
FIG. 2 A schematic diagram illustrating the schematic configuration of a game sound output device according to the embodiment of the present invention.

FIG. 2 is an exemplary diagram illustrating the schematic configuration of a game sound output device according to the present embodiment. Such the game sound output device is a device as one example in that a plurality of objects including a sound emitting object for emitting sound (an enemy character to be described later) and a sound detection object for detecting the sound emitted by the sound emitting object (a player character to be described later) are arranged in a virtual space within a game device, and that outputs the sound detected by the sound detection object as game sound. A description will be given hereinbelow referring to the present diagram.

A game sound output device 200 comprises an object storage unit 201, an operation unit 202, a character position management unit 203, an image creation unit 204, a sound volume calculation unit 205, a sound source 206 and an output sound control unit 207.

First, the object storage unit 201 stores information regarding a variety of objects to be arranged in the virtual space.

For example, the object storage unit 201 stores information regarding objects, such as a character of a player himself (a player character) to be operated by a player, an enemy character to emit predetermined sound (sound effect or the like), a fixed object to be arranged in a field or the like (a building, a wall, or the like).

Here, an object of the enemy character to be a sound emitting object is associated with sound effect data or the like regarding the sound source 206 to be described later.

Moreover, for an object not to be changed a location thereof in the virtual space, such as the fixed object, position information thereof in the virtual space is to be managed at such the object storage unit 201 as well.

And then the RAM 103 may function as such the object storage unit 201.

The operation unit 202 receives a predetermined instruction information according to an operation of the player. For example, the operation unit 202 receives such as a movement instruction, an action instruction, or the like, for a player character in a virtual space.

Here, the controller 105 may function as such the operation unit 202.

The character position management unit 203 manages position information (a current position or the like) of an object, such as a player character or an enemy character, to be changed in location in a virtual space. For example, the player character is to be changed in location in the virtual space according to a movement instruction received at the operation unit 202, and then such the position information is to be managed at the character position management unit 203. Moreover, the enemy character is to be changed in location in the virtual space for moving step by step toward the position of the player character, and then such the position information is to be managed thereat in the same way.

Here, the RAM 103 and the CPU 101 may function as such the character position management unit 203.

The image creation unit 204 creates a game image based on information stored (managed) in the object storage unit 201 and the character position management unit 203. For example, the image creation unit 204 arranges at a predetermined position in the virtual space an object, such as a fixed object or the like, stored in the object storage unit 201, and arranges at a current position managed in the character position management unit 203 an object, such as a player character, an enemy character, or the like, stored in the object storage unit 201. Moreover, it transparent transforms therefor from a predetermined view point position, it performs therefor such as a hidden surface removal, a texture mapping, or the like, and then it creates a game image for displaying.

Figure 3:
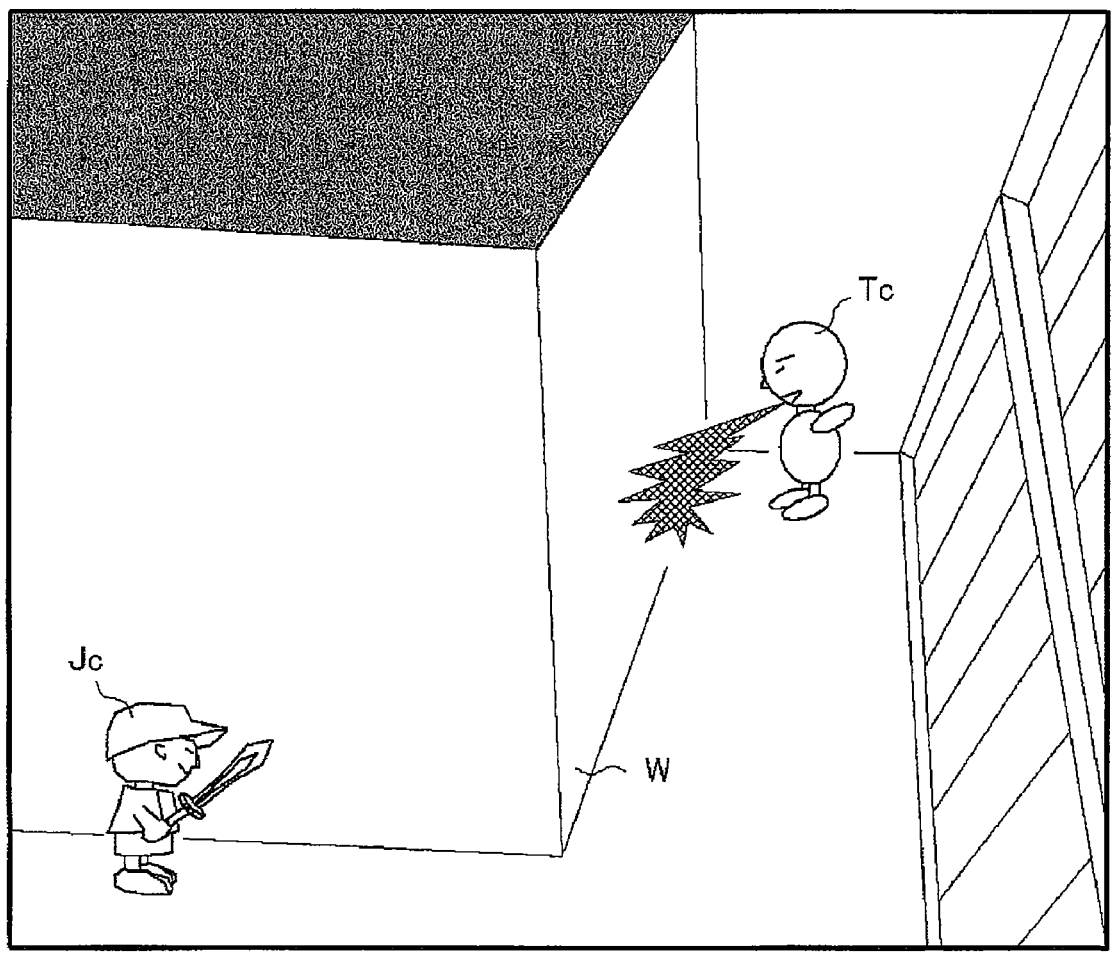
FIG. 3 A schematic diagram showing one example of game images in that individual characters are arranged along a wall.

More specifically, the image creation unit 204 creates a game image including an object or the like, such as a player character Jc, an enemy character Tc, a wall W, or the like, as shown in FIG. 3.

Here, the image processor 108 may function as such the image creation unit 204.

The sound volume calculation unit 205 recognizes a space or the like between a player character and an enemy character, and calculates a sound volume of sound to be detected by the player character (or sound to be emitted by the enemy character).

More specifically, the sound volume calculation unit 205 comprises a first sound volume calculation unit 251, a second sound volume calculation unit 252 and a third sound volume calculation unit 253. Further, such the units execute individual operations of a natural attenuation process, a wall interception process, and a space recognition attenuation process respectively, and then calculate a sound volume. The following describes such the individual processes referring to FIG. 4A to FIG. 4E, and then for the ease of understanding, it is to be described as a two-dimensional plane from a top view point of view for a three-dimensional virtual space.

Figure 4A:
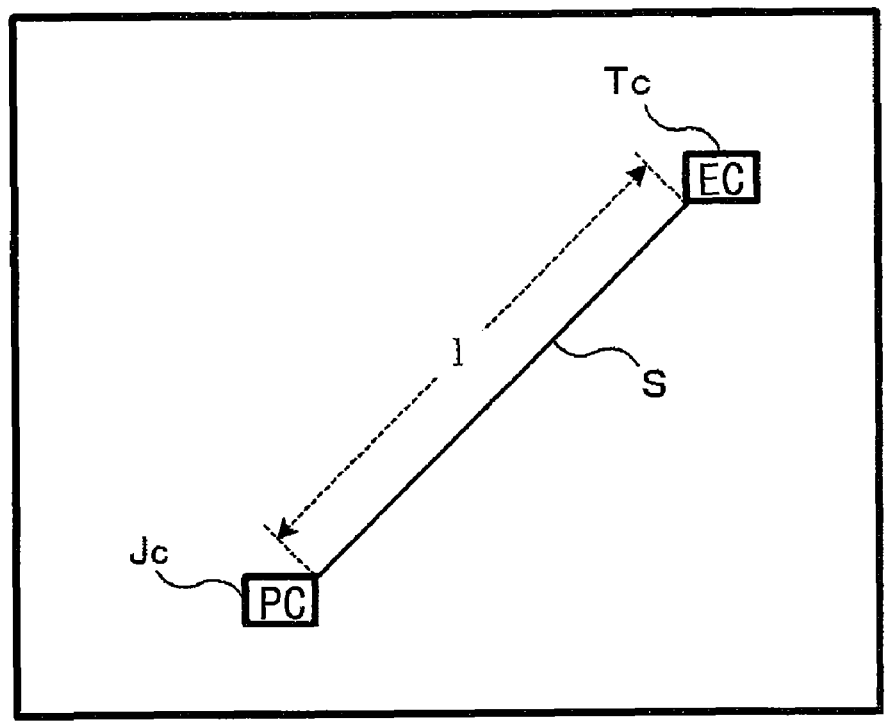
FIG. 4A A schematic diagram illustrating the individual operations of a natural attenuation process, a wall interception process, and a space recognition attenuation process.

First, a description regarding the natural attenuation process will be given. In such the natural attenuation process, a straight line S connecting a player character Jc and an enemy character Tc is to be obtained as shown in FIG. 4A, and then a sound volume is to be calculated with considering a natural attenuation corresponding to a length 1 of such the straight line S. Here, the natural attenuation corresponding to the length 1 is to be obtained by an operation according to a natural acoustic law, or it is to be obtained referring to a table in that the length and the natural attenuation are corresponded to therebetween, such as a table of an attenuation curve or the like.

Next, the sound volume calculation unit 205 calculates a sound volume after the natural attenuation process using the following formula 1 for example.

$$V1 = Vmax \times D1, \quad \text{(Formula 1)}$$

V1: the sound volume after a natural attenuation process,
Vmax: the maximum sound volume at the time of the closest approach,
D1: a natural attenuation corresponding to the length 1.

As one example, in a case of assuming the maximum sound volume (Vmax) at the time of the closest approach as 100 and the natural attenuation (D1) corresponding to the length 1 as 0.8, the sound volume (V1) after the natural attenuation process is to be calculated as 80.

Figure 4B:
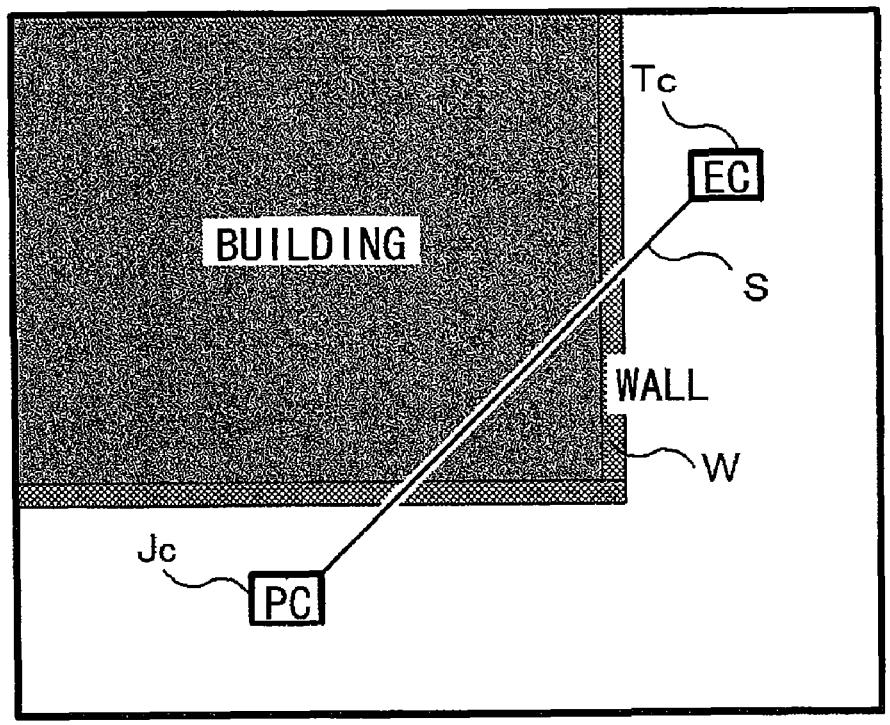
FIG. 4B A schematic diagram illustrating the individual operations of a natural attenuation process, a wall interception process, and a space recognition attenuation process.

Next, a description regarding the wall interception process will be given. In such the wall interception process, the straight line S connecting a player character Jc and an enemy character Tc is to be determined whether or not passing through an obstacle of a wall or the like, and then in a case of determining that it passes therethrough, a sound volume after the natural attenuation process is to be attenuated further. That is, it is to be determined that the straight line S passes a wall or the like as shown in FIG. 4B, or there is none of obstacles on the straight line S as shown in the above mentioned FIG. 4A. And then in a case of FIG. 4B, the sound volume calculation unit 205 calculates a sound volume of the wall interception process using the following formula 2 for example, which is attenuated further than the sound volume after the natural attenuation process.

$$V2 = V1 \times Dh, \quad \text{(Formula 2)}$$

V2: a sound volume after a wall interception process,
V1: a sound volume after a natural attenuation process,
Dh: an attenuation at the time of a wall interception.

As one example, in a case of assuming the sound volume (V1) after the natural attenuation process as 80 and the attenuation (Dh) at the time of the wall interception as 0.5, the sound volume (V2) after the wall interception process is to be calculated as 40.

Here, the attenuation at the time of the wall interception (Dh) is a value for a case as one example wherein a fixed object is the wall W, and it may be appropriately changed corresponding to a type (material or the like), a thickness, or the like, regarding the fixed object.

For example, values of the attenuation at the time of the wall interception (Dh) that are different in accordance with the material or the thickness to be set may be stored in the object storage unit 201, as object information regarding the fixed object to be stored. And then at the time of operating the above mentioned formula 2, the operation is to be executed referring to the attenuation (Dh) of the fixed object as the object that the straight line S passes therethrough. Thus, it is possible to control appropriately a sound volume after the wall interception process corresponding to the fixed object as the object.

Last, a space recognition attenuation process will be described. In such the space recognition attenuation process, from both the player character and the enemy character a same plural number of space recognition lines having different angles with respect to the straight line S locating as a center are drawn, and then the sound volume after the wall interception process (or after the natural attenuation process) is further attenuated in accordance with the number (more specifically, a ratio) of the space recognition lines intersecting with each other without being intercepted by the obstacle.

Figure 4C:
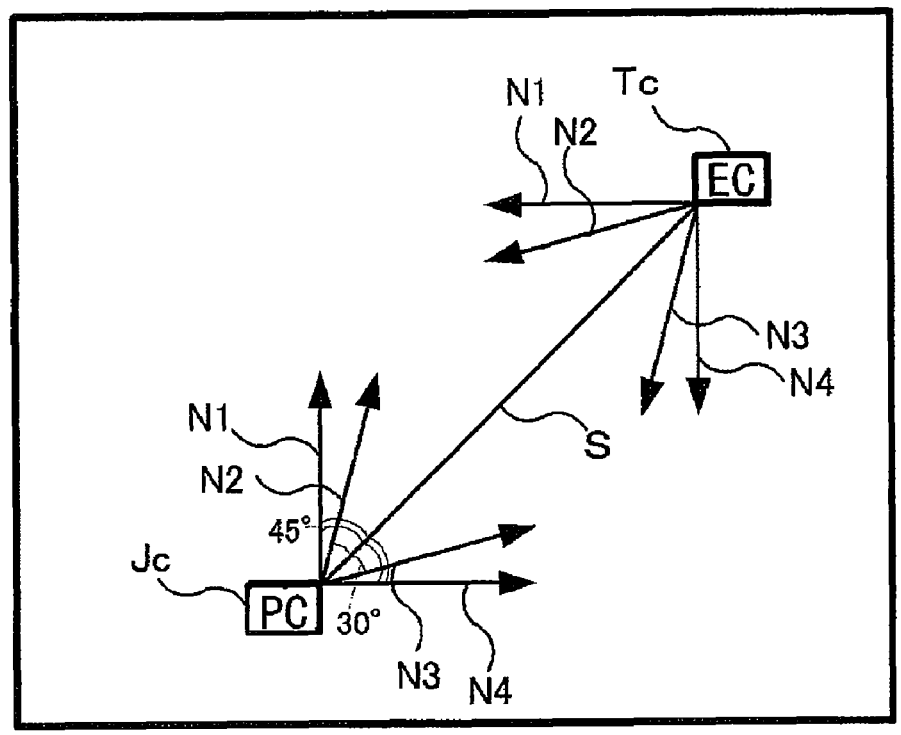
FIG. 4C A schematic diagram illustrating the individual operations of a natural attenuation process, a wall interception process, and a space recognition attenuation process.

For example, space recognition lines N1 to N4 having angles of 30 degrees and 45 degrees to the left and to the right respectively around the straight line S locating as a center are to be drawn from the player character Jc, and also from the enemy character Tc, the space recognition lines N1 to N4 having angles of 30 degrees and 45 degrees to the left and to the right respectively around the straight line S locating as a center are to be drawn, as shown in FIG. 4C. And then whether or not the space recognition lines N1 to N4 (each pair of the space recognition lines N1 to N4 to have the same angle) intersect with no interception from the obstacle is to be determined.

Figure 4D:
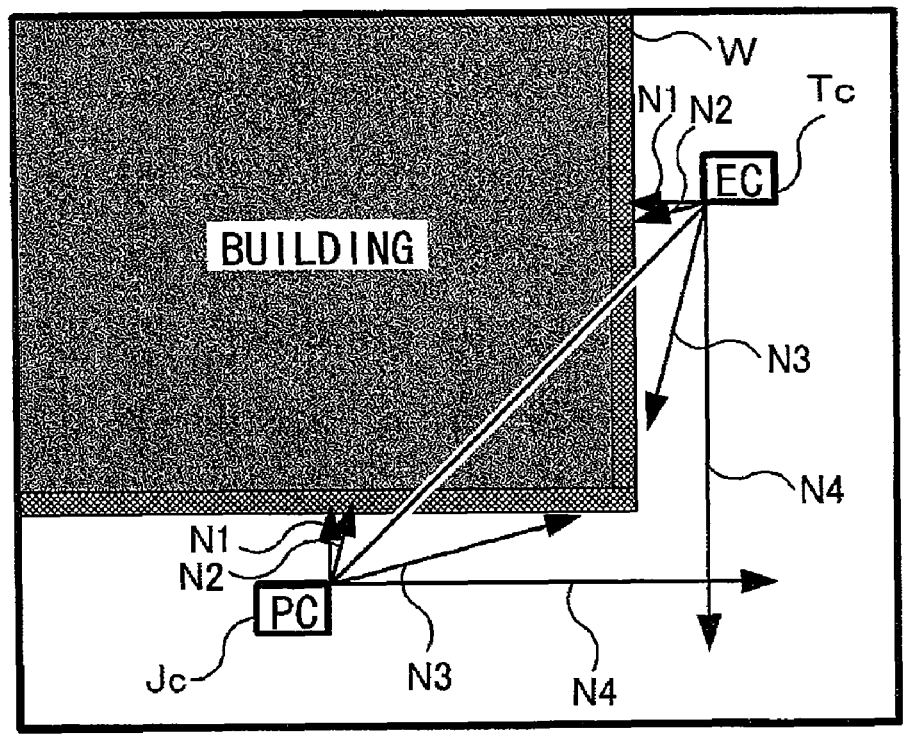
FIG. 4D A schematic diagram illustrating the individual operations of a natural attenuation process, a wall interception process, and a space recognition attenuation process.
Figure 4E:
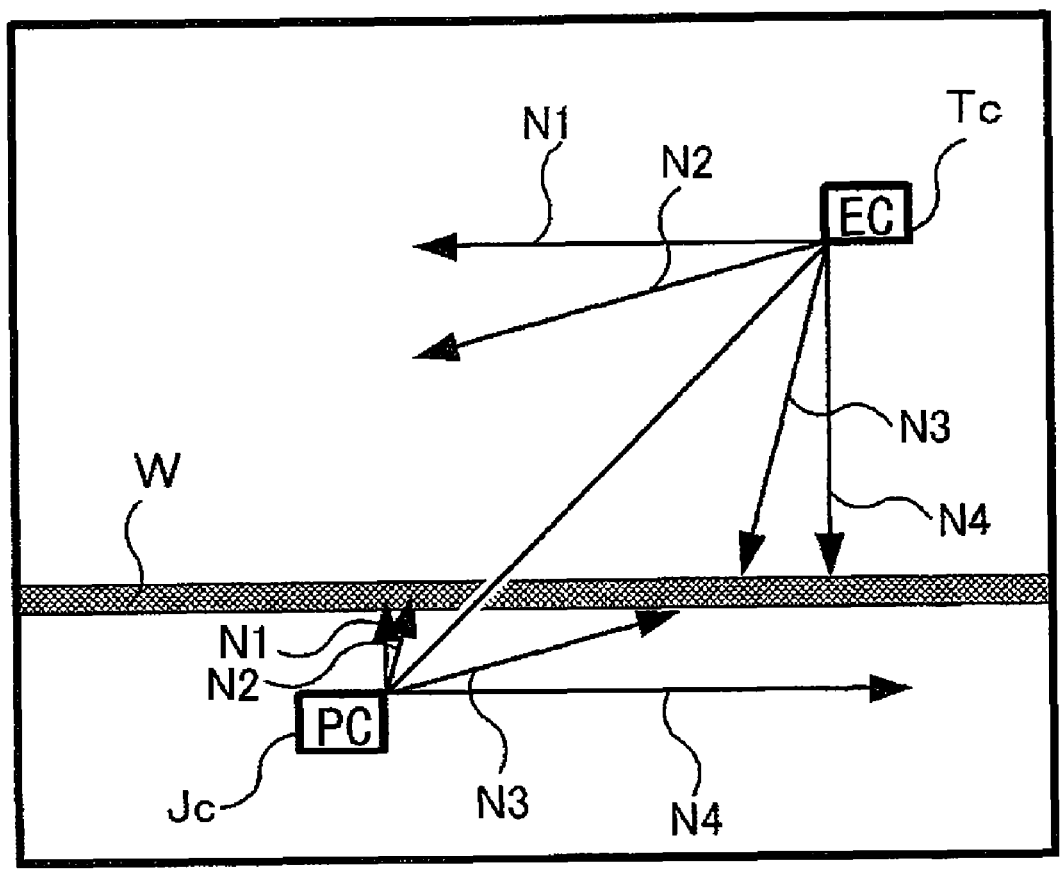
FIG. 4E A schematic diagram illustrating the individual operations of a natural attenuation process, a wall interception process, and a space recognition attenuation process.

More specifically, in the case as shown in FIG. 4D, it is to be determined that the space recognition lines N1 to N3 are intercepted by the wall W or the like and then only one of the space recognition lines (only the space recognition line N4) is intersecting with no interception therefrom. On the contrary, in the case as shown in FIG. 4E, it is to be determined that all of the space recognition lines N1 to N4 are intercepted by the wall W and then none of the space recognition lines (that is, the number as 0) is intersecting.

And then a space recognition attenuation corresponding to the number of the intersecting space recognition lines is to be determined. For example, the space recognition attenuation is to be determined as 1 in the case where all four of the space recognition lines are intersecting, the space recognition attenuation is to be determined as 0.75 in the case where three of them are intersecting, the space recognition attenuation is to be determined as 0.5 in the case where two of them are intersecting, the space recognition attenuation is to be determined as 0.25 in the case where one of them is intersecting, and the space recognition attenuation is to be determined as 0 in the case where 0 number of space recognition lines is intersecting (all of them are not intersecting).

And then the sound volume calculation unit 205 calculates a sound volume after the space recognition attenuation process using the following formula 3 for example.

$$V3 = V2(\text{or } V1) \times Dk, \quad \text{(Formula 3)}$$

V3: a sound volume after a space recognition attenuation process,
V2: a sound volume after a wall interception process,
(V1: a sound volume after a natural attenuation process),
Dk: a space recognition attenuation.

As one example, assuming the sound volume (V2) after the wall interception process as 40, the sound volume (V3) after the space recognition attenuation process is to be calculated as 10 due to the space recognition attenuation (Dk) becoming to be as 0.25 in the case as shown in FIG. 4D. On the other hand, the sound volume (V3) after the space recognition attenuation process is to be calculated as 0 due to the space recognition attenuation (Dk) becoming to be as 0 in the case as shown in FIG. 4E.

Here, there is described using a plane regarding the above mentioned FIGS. 4C to 4E for the ease of understanding the description, however, in an actual space recognition attenuation process, by drawing a plurality of space recognition lines from each of the characters for being spread in three-dimensional (for example, radially) around a straight line S locating as a center in a three-dimensional virtual space, a presence of intersection therebetween is to be determined. And then a space recognition attenuation corresponding to a ratio of the number of the intersecting space recognition lines occupying of the total number is to be determined.

And then the CPU 101 or the like may function as such the sound volume calculation unit 205.

The sound source 206 is comprised of a PCM sound source or the like, and manages a variety of data to be a base for game sound. For example, the sound source 206 manages sound effect data or the like to be a base for sound effect emitted by an enemy character, and then reproduces the sound effect or the like according to a relationship of the enemy character with an object stored in the object storage unit 201.

Here, the sound processor 109 or the like may function as such the sound source 206.

The output sound control unit 207 outputs appropriately game sound. For example, the output sound control unit 207 controls the sound effect or the like reproduced by the sound source 206 to be with a sound volume calculated by the sound volume calculation unit 205, and then outputs it as the game sound from a predetermined speaker or the like.

Here, the sound processor 109 may function as such the output sound control unit 207.

(Overview of Operation of the Game Sound Output Device)

Figure 5:
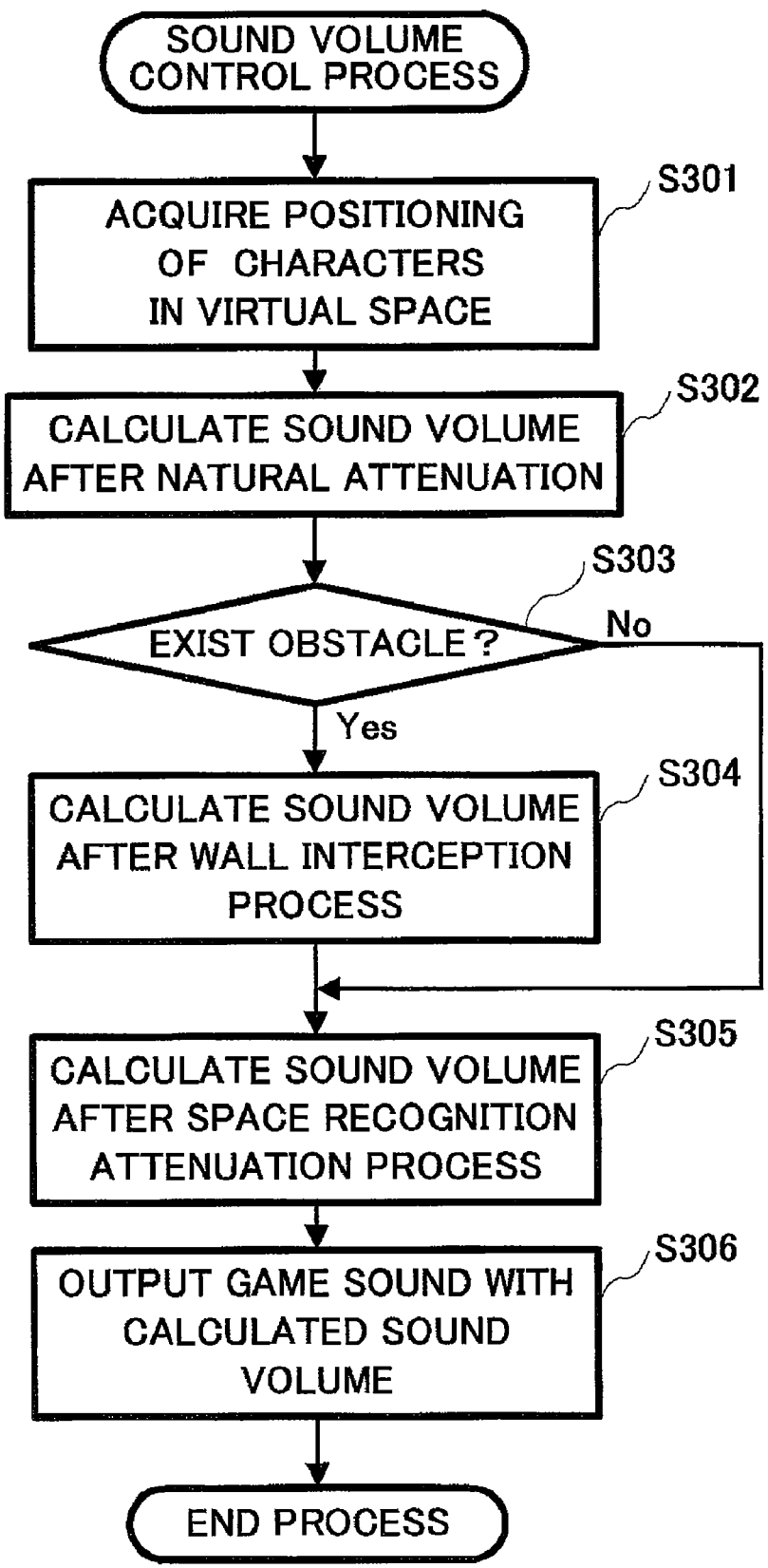
FIG. 5 A flowchart showing one example of the game sound control process according to the embodiment of the present invention.

FIG. 5 is a flowchart showing the flow of control of a game sound control process performed in the game sound output device 200 of the above mentioned configuration. A description regarding an operation of the game sound output device 200 will be given hereinbelow referring to the present flowchart. Such the game sound control process is executed repeatedly in real time (for example, every one sixtieth second) during the execution of a predetermined game that a player character, an enemy character, or the like appear therein.

Here, as above mentioned, the current position of the player character or the like is appropriately updated according to the instruction or the like from the operation unit 202, and then managed at the character position management unit 203.

First, the game sound output device 200 acquires positioning of the objects in the virtual space (step S301). That is, it acquires the positioning of a fixed object, a player character and an enemy character, based on information stored (managed) in the object storage unit 201 and the character position management unit 203.

Figure 6A:
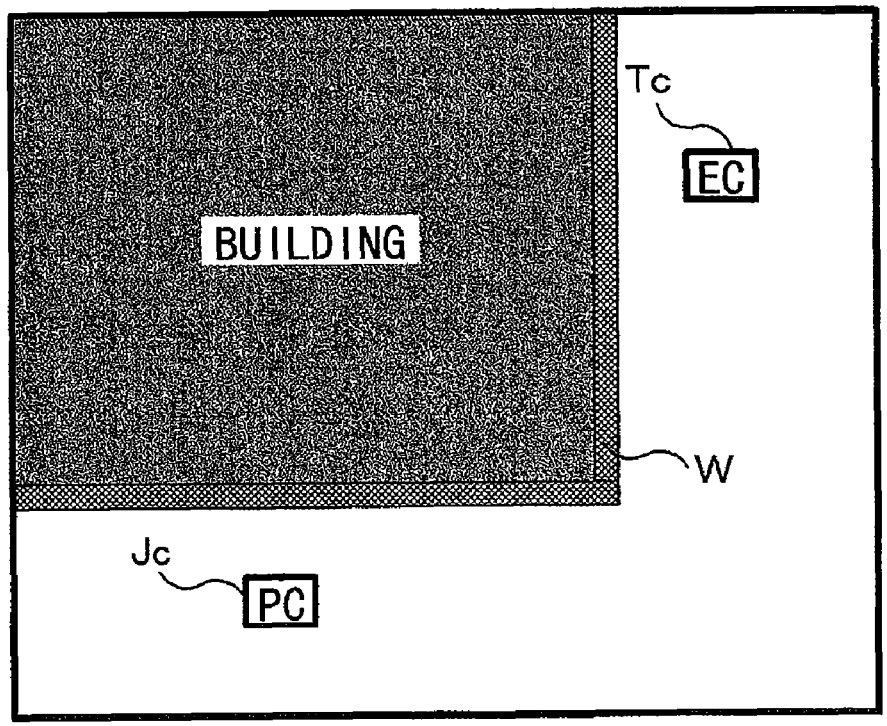
FIG. 6A A schematic diagram illustrating the embodied operation example.

For example, the game sound output device 200 acquires the positioning of the fixed object of a wall W or the like, the player character Jc and the enemy character, as shown in FIG. 6A. Here, such FIG. 6A to FIG. 6D are also to be shown as a two-dimensional plan views from a top view point of view for a three-dimensional virtual space, for the ease of understanding the description.

Figure 6B:
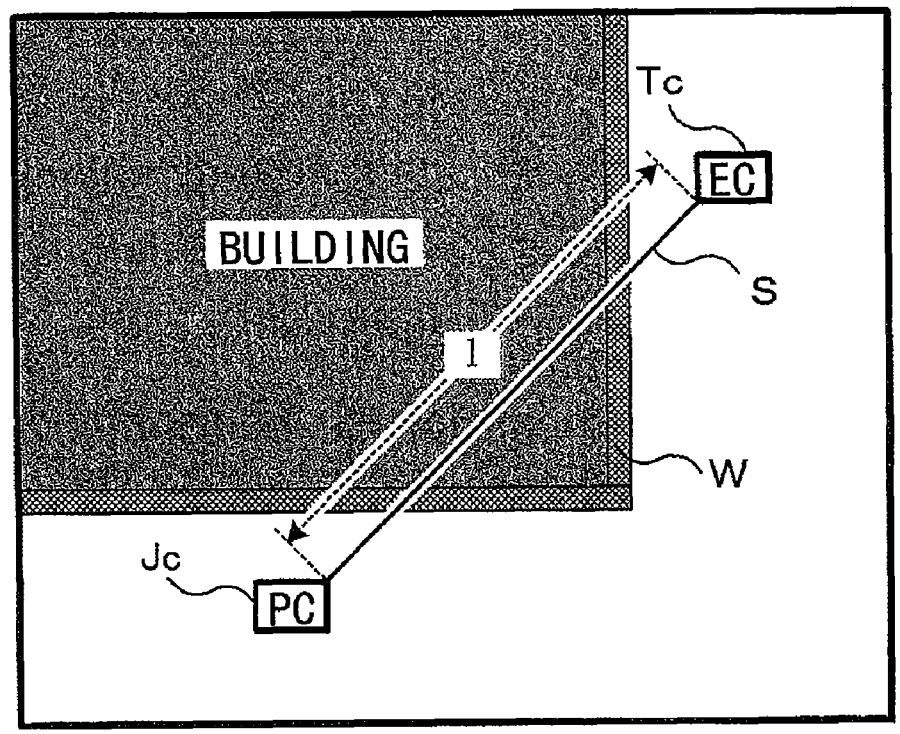
FIG. 6B A schematic diagram illustrating the embodied operation example.

The game sound output device 200 calculates a sound volume after a natural attenuation process (step S302). For example, the game sound output device 200 obtains a straight line S connecting a player character Jc and an enemy character Tc as shown in FIG. 6B, and calculates a sound volume with considering a natural attenuation corresponding to the length l of such the straight line S. That is, it calculates the sound volume after the natural attenuation process using the above mentioned formula 1.

The game sound output device 200 determines a presence of an obstacle on the straight line connecting the characters (step S303). That is, it determines whether or not the straight line S as shown in FIG. 6B or the like passes through the obstacle.

If the game sound output device 200 determines that there is no obstacle exists on the straight line (step S303: No), it forwards the process to a step S305 as described later.

On the contrary, in a case where the game sound output device 200 determines that there is an obstacle exists on the straight line (step S303: Yes), it calculates a sound volume of the wall interception process, which is further attenuated the sound volume after the natural attenuation process (step S304) That is, the game sound output device 200 calculates the sound volume of the wall interception process by using the above mentioned formula 2 in the case as shown in FIG. 6B.

Figure 6C:
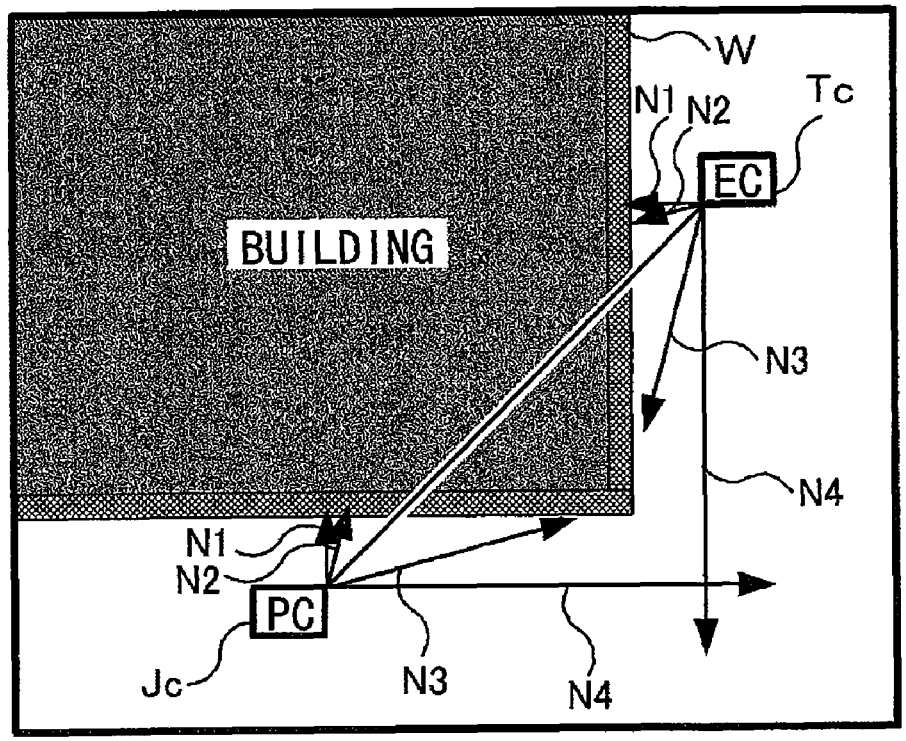
FIG. 6C A schematic diagram illustrating the embodied operation example.

The game sound output device 200 calculates a sound volume after a space recognition attenuation process (step S305). For example, it draws from each of the characters space recognition lines N1 to N4 having different angles from a straight line S locating as a center, and then it obtains the number (or a ratio) of the space recognition lines intersecting with no interception from an obstacle, as shown in FIG. 6C. And then it determines a space recognition attenuation corresponding to the number or the like of the intersecting space recognition lines. For example, in the case as shown in FIG. 6C, the game sound output device 200 determines the space recognition attenuation as 0.25 for example, because only one of the space recognition lines (only the space recognition line N4) is intersecting with no interception therefrom.

The game sound output device 200 calculates the sound volume after the space recognition attenuation process by applying such the determined space recognition attenuation to the above mentioned formula 3.

And then the game sound output device 200 outputs game sound with the calculated sound volume (step S306). That is, it outputs a sound effect or the like regarding the enemy character Tc with the sound volume after the space recognition attenuation process calculated in the above mentioned step S305.

Figure 6D:
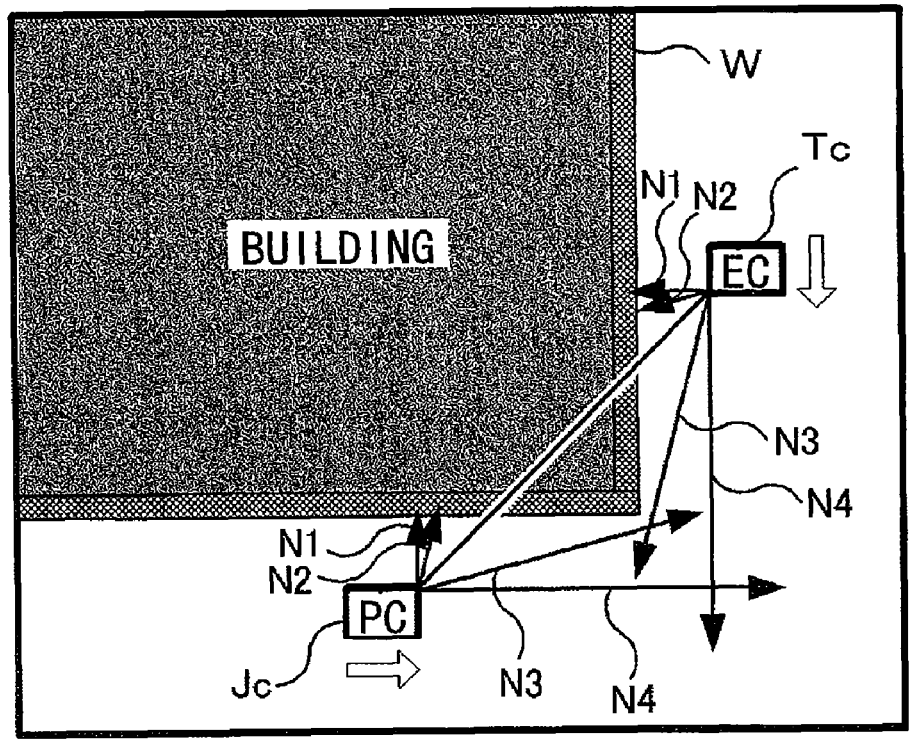
FIG. 6D A schematic diagram illustrating the embodied operation example.

According to such the game sound control process, it becomes possible to execute repeatedly a process in real time (for example, every one sixtieth second), because it is possible to calculate a sound volume of a sound emitting object (an enemy object or the like) by a relatively easy operation or the like. Thus, in a case where the characters as shown in FIG. 6C move respectively to be close to each other as shown in FIG. 6D, it is to be reflected immediately, and then the sound volume of the game sound becomes to be larger.

That is, the number of the intersecting space recognition lines is one and then the final sound volume (the sound volume after the space recognition attenuation process) is 10 (=40×0.25) in the case as shown in FIG. 6C. On the contrary, the number of the intersecting space recognition lines becomes increased to be two and then the final sound volume is increased to be 20 (=40×0.5) in the case as shown in FIG. 6D.

Thus, it is possible to control appropriately game sound using a relatively easy operation to be applicable to a game device or the like, without executing a complicated operation of such as an acoustic simulation or the like.

That is, it is possible to clarify the difference of the sound volume for between the case where the spaces for the individual characters are connected therebetween (no obstacles) and the case where that are intercepted by the obstacle, and then it is possible for a player to feel sounds with higher reality and further close to the real.

Other Embodiments

According to the above-described embodiment, the presence of the intersection or the like is obtained by using a plurality of (four) space recognition lines having the angles of 30 degrees and 45 degrees to the left and to the right or the like respectively, however, such the angles are one example, and it is applicable with other angles thereto as well. Moreover, the number of lines is not limited thereto, and it is possible to modify appropriately as well.

Moreover, the values of the attenuation regarding the above mentioned natural attenuation process, the wall interception process and the space recognition attenuation process are also one example, and it is applicable with other values thereto as well.

According to the above-described embodiment, there is described the case where the sound volume calculation unit 205 executes the three operations of the natural attenuation process, the wall interception process and the space recognition attenuation process, and then it calculates the sound volume, however, it may calculate a sound volume in a further simplified way.

Figure 7A:
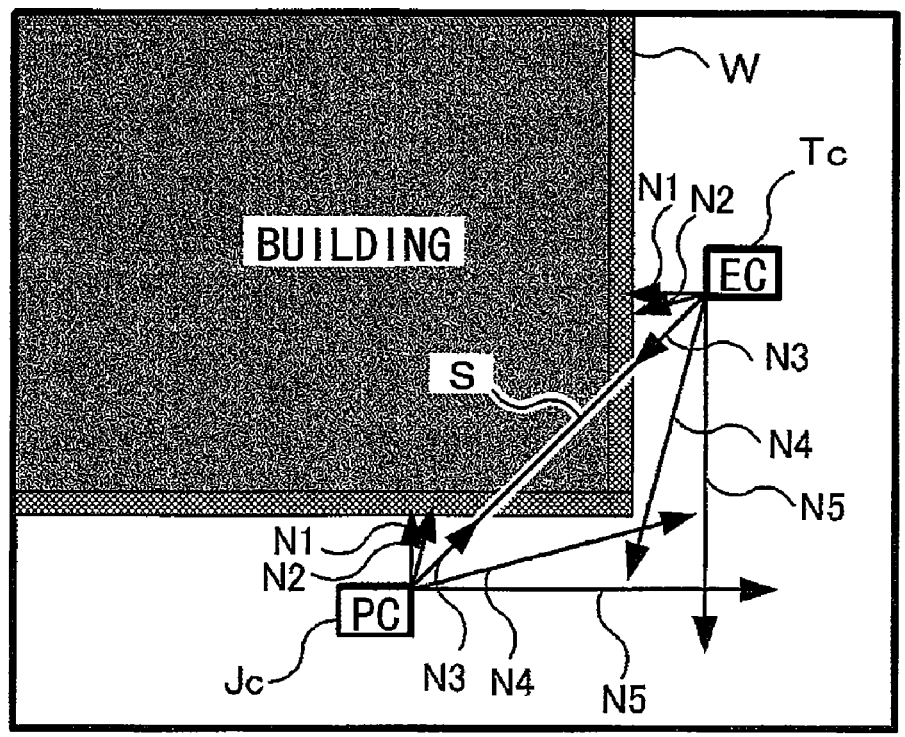
FIG. 7A A schematic diagram illustrating another operation example.
Figure 7B:
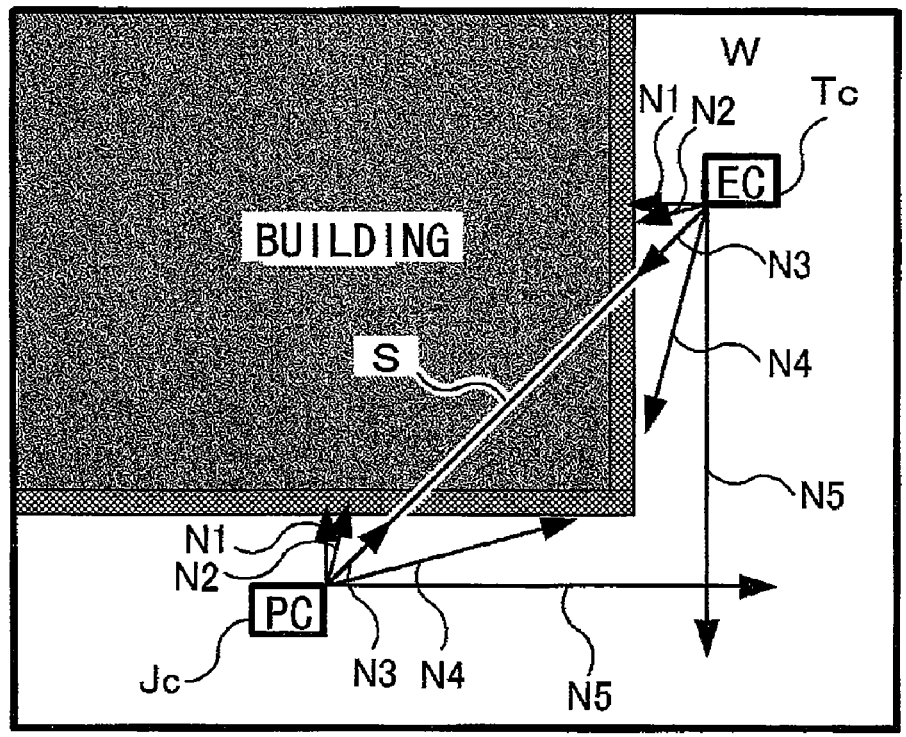
FIG. 7B A schematic diagram illustrating another operation example.
Figure 8A:
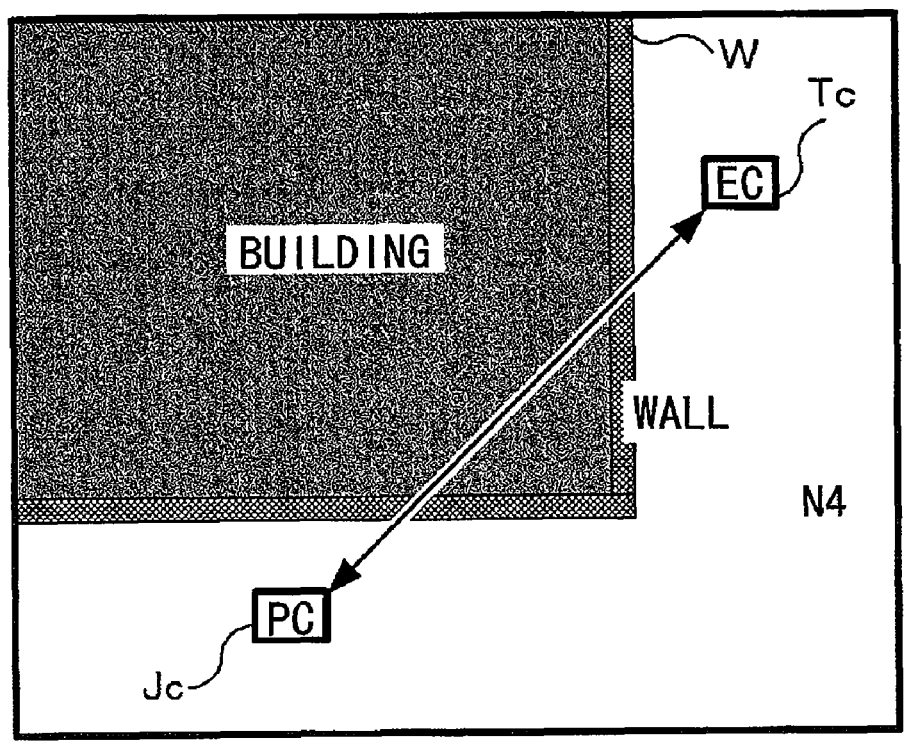
FIG. 8A A schematic diagram illustrating the game sound output from a conventional game device.
Figure 8B:
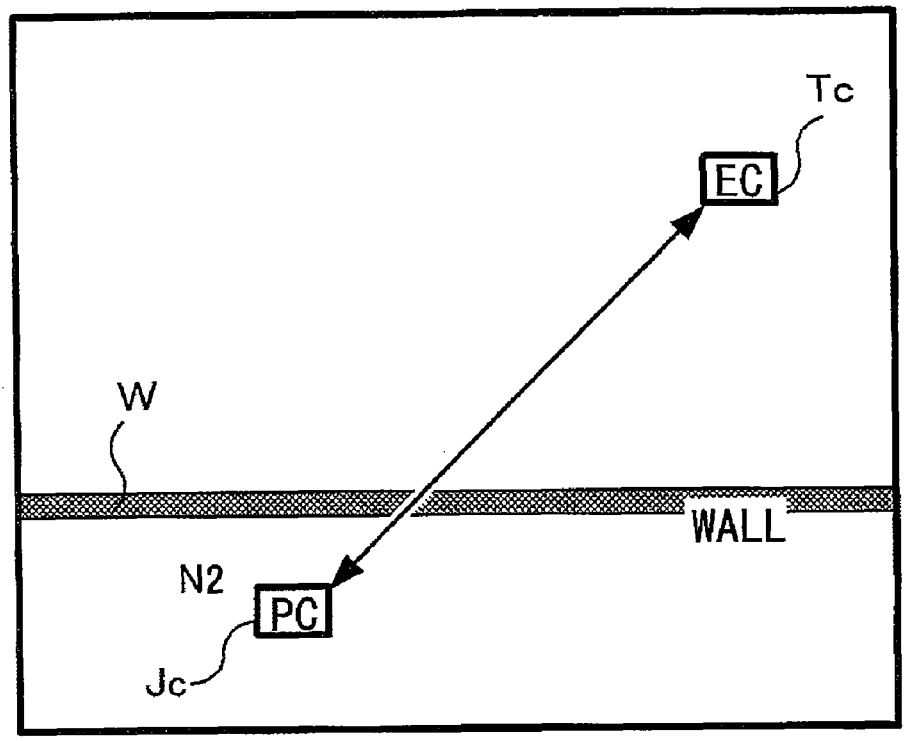
FIG. 8B A schematic diagram illustrating the game sound output from a conventional game device.

For example, the sound volume calculation unit 205 draws from both the player character Jc and the enemy character Tc a plurality of space recognition lines N1 to N5 including a straight line S, and then determines presence or absence of the intersecting space recognition lines without being intercepted by an object that is an obstacle, as shown in FIG. 7A. For example, the space recognition lines N4 and N5 intersect in the case as shown in FIG. 7B. Moreover, it determines each of natural attenuations corresponding to each length of the intersecting space recognition lines (the total of the lengths from each of the characters to the intersection point) and each of angle attenuations corresponding to each of angles of the space recognition lines (absolute values based on the straight line S locating as a center) respectively. And then it calculates a sound volume using the following formula 4 for example.

$$V4 = Vmax \times \Sigma(D1 \times Da), \quad \text{(Formula 4)}$$

V4: a sound volume after an attenuation,

Vmax: the maximum sound volume at the time of the closest approach,

D1: a natural attenuation corresponding to a length 1 of a space recognition line, Da: an angle attenuation corresponding to an angle of a space recognition line.

As one example in the case as shown in FIG. 7B, assuming the maximum sound volume (Vmax) at the time of the closest approach as 100, the natural attenuation (D1) corresponding to the length of the space recognition lines N4 and N5 as 0.7 and 0.4 respectively, and the angle attenuation (Da) corresponding to the angle of the space recognition lines N4 and N5 as 0.2 and 0.15 respectively, the sound volume (V4) after the attenuation is to be calculated as $100 \times ((0.7 \times 0.2) + (0.4 \times 0.15)) = 20$.

In this case, it is possible to control appropriately game sound using a relatively easy operation to be applicable to a game device or the like as well, without executing a complicated operation of such as an acoustic simulation or the like.

According to the above-described embodiment, there is described the case where the player character detects the sound effect or the like emitted by the enemy character and such the detected sound is to be output as game sound, however, it is also applicable appropriately to a case where sound detected by a virtual microphone arranged in a virtual space is to be output as game sound.

The present invention claims the priority based on Japanese Patent Application No. 2006-066873 the entire contents of which are incorporated herein by reference.

INDUSTRIAL APPLICABILITY

As described above, the present invention can provide a game sound output device, a game sound control method, an information recording medium and a program suitable for realizing easily an appropriate control of game sound.

The invention claimed is:

1. A game sound output device, in which a plurality of objects including a sound emitting object that emits sound and a sound detection object that detects the sound emitted by the sound emitting object are arranged in virtual space, and which outputs the sound detected by the sound detection object as game sound, the game sound output device comprising:

a first sound volume calculation unit (251) configured to obtain a length of a straight line connecting the sound emitting object and the sound detection object, and to calculate a first sound volume that is attenuated from a predetermined reference sound volume in accordance with the length;

a second sound volume calculation unit (252) configured to calculate a second sound volume that is attenuated from the first sound volume by a predetermined ratio if there is an obstacle on the straight line;

a third sound volume calculation unit (253) configured to draw from both the sound emitting object and the sound detection object a same plural number of space recognition lines that spread in a plane and at predetermined angles from the straight line locating as a center, and calculates a third sound volume that is attenuated from either one of the first sound volume and the second sound volume in accordance with an attenuation ratio determined by the number of the space recognition lines having a same angle and intersecting with each other without being intercepted by the obstacle; and a sound volume control unit (207) coupled to the third volume calculation unit and being configured to output game sound based on the calculated third sound volume.

2. The game sound output device according to claim 1, wherein the first sound volume calculation unit (251) calculates the first sound volume that is attenuated from sound emitted by the sound emitting object with the maximum sound volume thereof and in accordance with an attenuation ratio determined by the obtained length of the straight line.

3. The game sound output device according to claim 1, wherein the second volume calculation unit (252) calculates the second sound volume attenuated in accordance with an attenuation ratio determined depending on a type of the other object that is an obstacle.

4. The game sound output device according to claim 1, wherein the third sound volume calculation unit (253) draws from both the sound emitting object and the sound detection object a same plural number of the space recognition lines that spread in three-dimension at predetermined angles from the straight line obtained by the first sound volume calculation unit and locating as a center, and calculates a third sound volume attenuated from either one of the first sound volume and the second sound volume in accordance with an attenuation ratio determined by the number of the space recognition lines having a same angle in three-dimension and intersecting with each other without being intercepted by the other object that is the obstacle.

5. A game sound control method for a game device in which a plurality of objects including a sound emitting object that emits sound and a sound detection object that detects the sound emitted by the sound emitting object are arranged in a virtual space, and which outputs the sound detected by the sound detection object as game sound, the game sound control method comprising:

obtaining a length of a straight line connecting the sound emitting object and the sound detection object, and calculating a first sound volume that is attenuated from a predetermined reference sound volume in accordance with the length;

calculating a second sound volume attenuated from the first sound volume by a predetermined ratio if there is an obstacle on the straight line;

drawing from each of the sound emitting object and the sound detection object a same plural number of space recognition lines that spread in a plane and at predetermined angles from the straight line locating as a center, and calculating a third sound volume that is attenuated from either one of the first sound volume and the second sound volume in accordance with an attenuation ratio determined by the number of the space recognition lines having a same angle and without being intercepted by the other object that is the obstacle; and outputting game sound, using a volume control unit (207) based on the calculated third sound volume.

6. A non-transitory computer-readable information recording medium storing a program for controlling a computer in which a plurality of objects including a sound emitting object that emits sound and a sound detection object that detects the sound emitted by the sound emitting object are arranged in a virtual space, and that outputs the sound detected by the sound detection object as game sound, wherein the program controls the computer to function as:

a first sound volume calculation unit (251) configure to obtain a length of a straight line connecting the sound emitting object and the sound detection object, and to calculate a first sound volume attenuated from a predetermined reference sound volume in accordance with the length;

a second sound volume calculation unit (252) configure to calculated a second sound volume attenuated from the first sound volume by a predetermined ratio;

a third sound volume calculation unit (253) configured to draw from both the sound emitting object and the sound detection object a same plural number of space recognition lines that spread in a plane and at predetermined angles from the straight line locating as a center, and calculates a third sound volume attenuated from either one of the first sound volume and the second sound volume in accordance with an attenuation ratio determined by the number of the space recognition lines having a same angle and intersecting with each other without being intercepted by the other object that is an obstacle; and a sound volume control unit (207) coupled to the third volume calculation unit and being configured to output game sound based on the calculated third sound volume.

\* \* \* \* \*

UNITED STATES PATENT AND TRADEMARK OFFICE
CERTIFICATE OF CORRECTION

PATENT NO.       : 8,221,237 B2
APPLICATION NO.  : 12/282835
DATED            : July 17, 2012
INVENTOR(S)      : Hiroyuki Nakayama It is certified that error appears in the above-identified patent and that said Letters Patent is hereby corrected as shown below:

Column 14, line 23: Delete "(251)"

Column 14, line 29: Delete "(252)"

Column 14, line 33: Delete "(253)"

Column 14, line 44: Delete "(207)"

Column 14, line 48: Delete "(251)"

Column 14, line 54: Delete "(252)"

Column 14, line 59: Delete "(253)"

Column 15, line 29: Delete "(207)"

Column 16, line 7: Delete "(251)"

Column 16, line 13: Delete "(252)"

Column 16, line 16: Delete "(253)"

Column 16, line 28: Delete "(207)"

Signed and Sealed this
Twenty-fifth Day of September, 2012

David J. Kappos
*Director of the United States Patent and Trademark Office*